United States Patent
Buge et al.

(10) Patent No.: US 7,125,237 B2
(45) Date of Patent: Oct. 24, 2006

(54) TOOLING FOR MOLDING WITH KEYS PARTICULARLY FOR THE PRODUCTION OF AIR INTAKES WITHOUT CLIPS

(75) Inventors: Michel Buge, Saint Sebastien sur Loire (FR); Jacques Lalane, Saint Orens (FR); Alain Porte, Colomiers (FR); Eric Rambaud, Les Sorinieres (FR)

(73) Assignee: Airbus France, Toulouse cedex (FR)

( * ) Notice: Subject to any disclaimer, the term of this patent is extended or adjusted under 35 U.S.C. 154(b) by 447 days.

(21) Appl. No.: 10/606,794

(22) Filed: Jun. 27, 2003

(65) Prior Publication Data

US 2004/0065775 A1  Apr. 8, 2004

(30) Foreign Application Priority Data

Jun. 27, 2002 (FR) .................................. 02 08014

(51) Int. Cl.
*B29C 63/06* (2006.01)
(52) U.S. Cl. ...................... 425/182; 425/186; 425/330; 425/441; 425/451.5
(58) Field of Classification Search ................ 425/182, 425/186, 330, 441, 443, 450, 451.1, 451.5, 425/468
See application file for complete search history.

(56) References Cited

U.S. PATENT DOCUMENTS 1,835,986 A  12/1931  Heston
4,278,490 A  *  7/1981  Pistole et al. ................ 425/440
4,436,574 A  *  3/1984  Long et al. .................. 156/415
4,610,422 A  *  9/1986  Kraiss ......................... 425/441

FOREIGN PATENT DOCUMENTS

| DE | 1 262 570 | 3/1968 |
| DE | 1 504 597 | 5/1969 |
| DE | 2 259 690 | 6/1974 |
| DE | 23 52 373 | 4/1975 |
| EP | 0184759 A2 * | 3/1958 |

\* cited by examiner

*Primary Examiner*—Duane Smith
*Assistant Examiner*—Thu Khanh T. Nguyen
(74) *Attorney, Agent, or Firm*—Young & Thompson

(57) ABSTRACT

Tooling for molding with keys for the production of air intakes without clips of substantially tubular shape, comprises a self-supporting mandrel with keys comprising at least three sectors in the form of panels, namely at least two articulated sectors (3) retractable toward the center of the mandrel and a key sector independent from the other sectors and insertable between these latter, thereby, by abutment, to define, by their external surfaces, a continuous surface corresponding to the internal surface of the air intake, elements to lock in abutted position the sectors, and a control device, disconnectable from the mandrel, of the relative displacement of the movable sectors to place them either in a molding position by abutment of the sectors, or in an unmolding position by retraction of the sectors toward the interior of the mandrel.

14 Claims, 9 Drawing Sheets

US 7,125,237 B2

TOOLING FOR MOLDING WITH KEYS PARTICULARLY FOR THE PRODUCTION OF AIR INTAKES WITHOUT CLIPS

BACKGROUND OF THE INVENTION

The present invention relates to the production of air intakes for nacelles containing the engine group, particularly for a jet engine, for aircraft.

The nacelle has a substantially annular cross-section and defines between it and a central portion of the engine an annular so-called fan channel.

The wall of the nacelle defining the fan channel is treated acoustically and constitutes a sandwich formed from a central cellular core flanked, on the fan channel side, with an acoustically resistive layer and, on the other side, with a total reflector.

This wall is conventionally formed of several sectors or segments, generally three or four, butted together by clipping to constitute a substantially annular conduit.

It is also known to produce air intakes with the help of two clipped panels, substantially semicircular in cross-section, with the help of a mold having the shape of half of an air intake. This technology could be pursued to its limit so as to produce a fan channel panel that is not only of one piece but also without clips, if the shape of such a panel permitted demolding without disassembly or destruction of the mold, which is not the case, the wall of a fan channel being almost always of a re-entrant shape.

SUMMARY OF THE INVENTION

The present invention has precisely for its object the provision of tooling for molding with keys, permitting particularly the production of air intakes without clips.

In the present description, an air intake without clips is formed of a panel of a substantially tubular shape constituted by a sandwich comprising a central cellular core, a total reflector and a resistive layer disposed on the internal surface of the panel, said internal surface comprising no connections nor clips that could disturb the acoustic damping of the panel.

To this end, the invention has for its object tooling for molding with keys for the production in particular of air intakes without clips of substantially tubular shape, comprising:

a self-supported mandrel with keys, comprising at least three sectors in the shape of panels, namely at least two articulated sectors retractable toward the center of said mandrel and a so-called key sector independent of the two other sectors and insertable between these latter, such that, upon abutting, there can be determined by the external surface a continuous surface corresponding to the internal surface of the air intake;

means to lock in abutted position said sector;

and, a control device, detachable from the mandrel, preferably automatic, for the relative displacement of the movable sectors to place them either in a molding position by abutting the sectors, or in an un-molding position by retraction of said sectors toward the interior of the mandrel.

According to a preferred embodiment, the tooling comprises:

a mandrel with keys comprising four sectors, namely a fixed sector and flanked by two other sectors that are symmetrical and articulated on the fixed sector, and a key sector independent from the others and insertable between the two articulated sectors by means to lock in abutted position the sectors, the mandrel being thus self-supported;

a control device for the relative displacement of the sectors to place them either in a molding position by abutment of all the sectors, or in an un-molding position by retraction of the three movable sectors inwardly of said mandrel, the control device being disengageable from the mandrel, and, means permitting the transport and rotation of the mandrel in its molding position, constituted by two movable flanges adaptable to the two ends of the mandrel, said flanges being connected by securement ties and provided at their center with a socket or the like for connection to drive means for said mandrel in rotation about its axis.

The device for controlling the displacement of the sectors is constituted for example by a structure for receiving the mandrel in vertical axial position, comprising:

first fixed means on which the fixed sector rests second movable means on which the key sector rests, these means being movable diametrically to the mandrel, and third and fourth means, respectively for support of the two articulated sectors, said third and fourth means each comprising a carriage movable inwardly of the mandrel and carrying a drive means on which one of said articulated sectors rests.

Such a mandrel, once shaped, which is to say with its sector panels abutted and locked and provided with its flanges, can be disposed horizontally on a device for driving it in rotation so as for example the emplacement of draping, winding or banding of the elements or elements constituting the acoustically resistive layer of a panel of a monobloc fan channel without clips, then for the emplacement of other constituent elements of the panel.

For polymerization, either of the single resistive layer, or of the assembly of sandwiches constituting the panel as well as if desired to carry out the steps of baking or welding in complement of said polymerization, the mandrel is retrieved and placed in the oven or autoclave after withdrawal or not of the flanges.

To recover finally the panel, the flanges are (if desired) returned into position on the mandrel which is thus positioned vertically on the mounting/unmounting device of the mandrel.

The device is, after unlocking of the key sector, actuated so that in the first place it is moved in translation inwardly of the key sector, then, in the second instance, pivoting inwardly the two articulated sectors so as to disengage these three sectors from the air intake panel thus produced, which can then easily be withdrawn.

The device can then be actuated by a reverse process to reconstitute a mandrel in such shape as to produce another panel.

BRIEF DESCRIPTION OF THE DRAWINGS

Other characteristics and advantages will become apparent from the description which follows, of one embodiment of the mandrel and its associated tooling, which description is given solely by way of example and with respect to the accompanying drawings, in which.

DETAILED DESCRIPTION OF THE PREFERRED EMBODIMENTS

Figure 2:
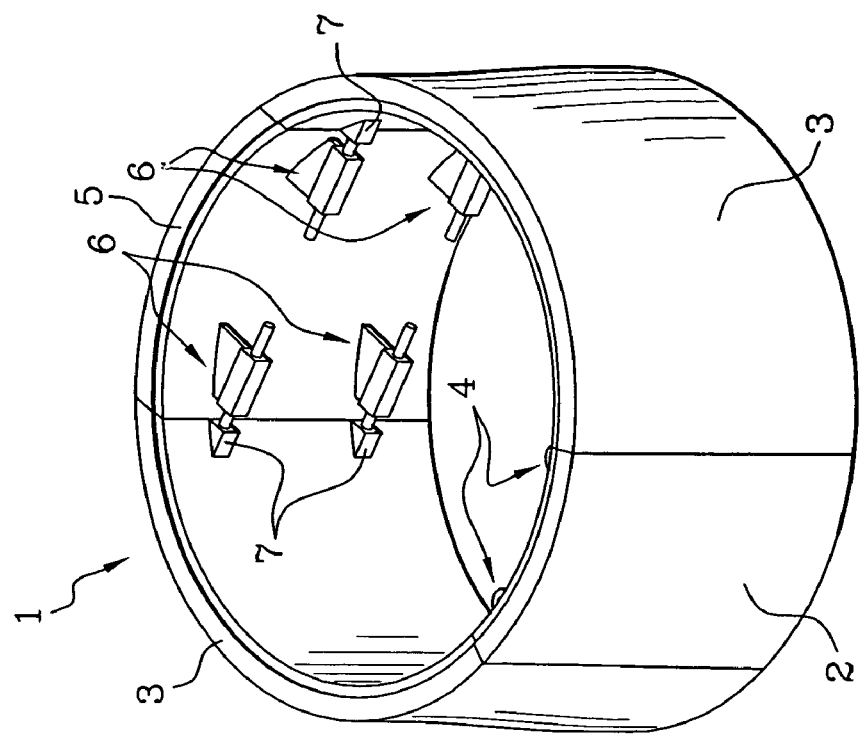
FIG. 2 is a view identical to that of FIG. 1, showing the internal surface of the mandrel that is not visible in FIG. 1.
Figure 1:
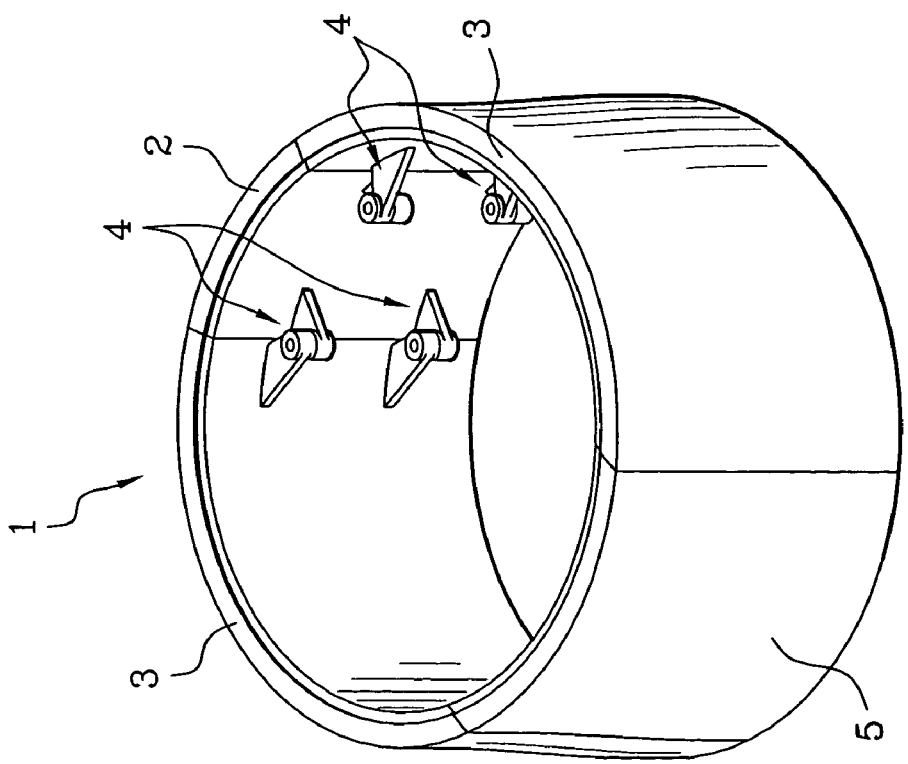
FIG. 1 is a schematic perspective view from above of a mandrel of a shape in accordance with the invention.
Figure 3:
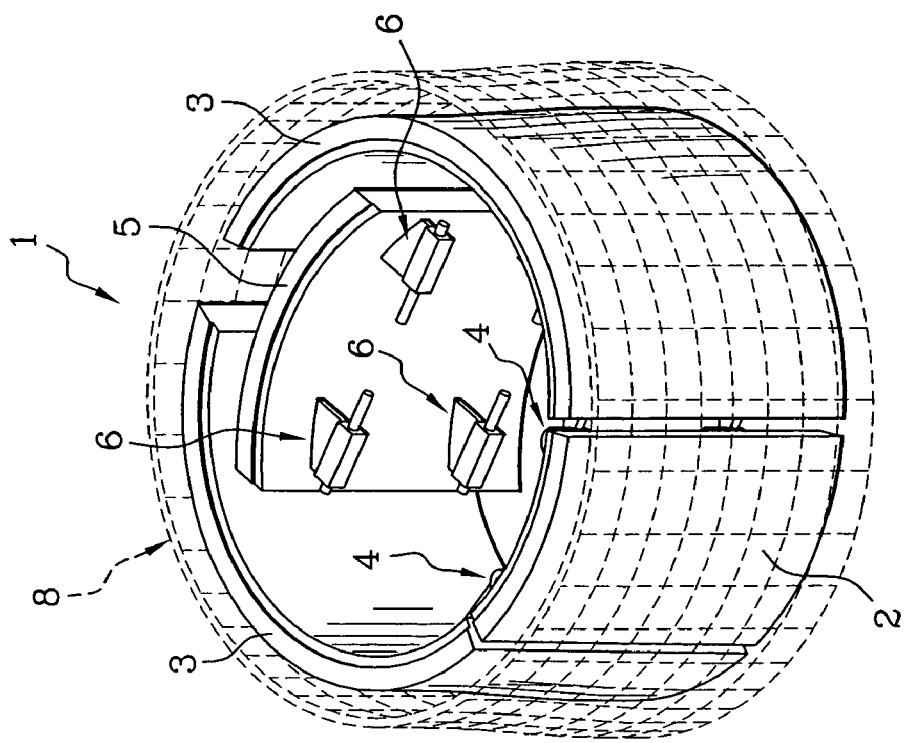
FIG. 3 is a view of the mandrel of FIG. 2 in retracted de-molding position.

In FIGS. 1 to 3, there is shown schematically a mandrel 1 with keys, according to the invention, respectively in its molding configuration (FIGS. 1 and 2) and in its unmolding configuration (FIG. 3).

The mandrel 1 is of generally tubular shape and constituted by four sections or sectors, namely a so-called fixed sector 2 on opposite sides of which are associated two identical sectors 3, called articulated sectors because they are connected to the fixed sector 2 each by a pair of hinges 4.

The fourth sector 5, called the key sector, is an independent sector interposed between the two articulated sectors 3. It is lockable in place on the two adjacent sectors 3 by locks 6 (FIG. 2) secured to the key sector 5 and coacting with keepers 7 fixed on the sectors 3 facing latches of locks 6.

Sectors 2, 3, 5, in the molding position of the mandrel 1, define an external surface which corresponds to the internal wall in contact with the air flow which enters the fan channel of the air intake panel to be produced.

The placing of the mandrel in the un-molding configuration (FIG. 3) takes place by retraction inwardly of the key sector 5, after unlocking the locks 6, then folding inwardly the articulated sectors 3 by rotation about the axis of the hinges 4. The tooling necessary for this operation will be described later with reference to FIGS. 8 to 11.

Figure 4:
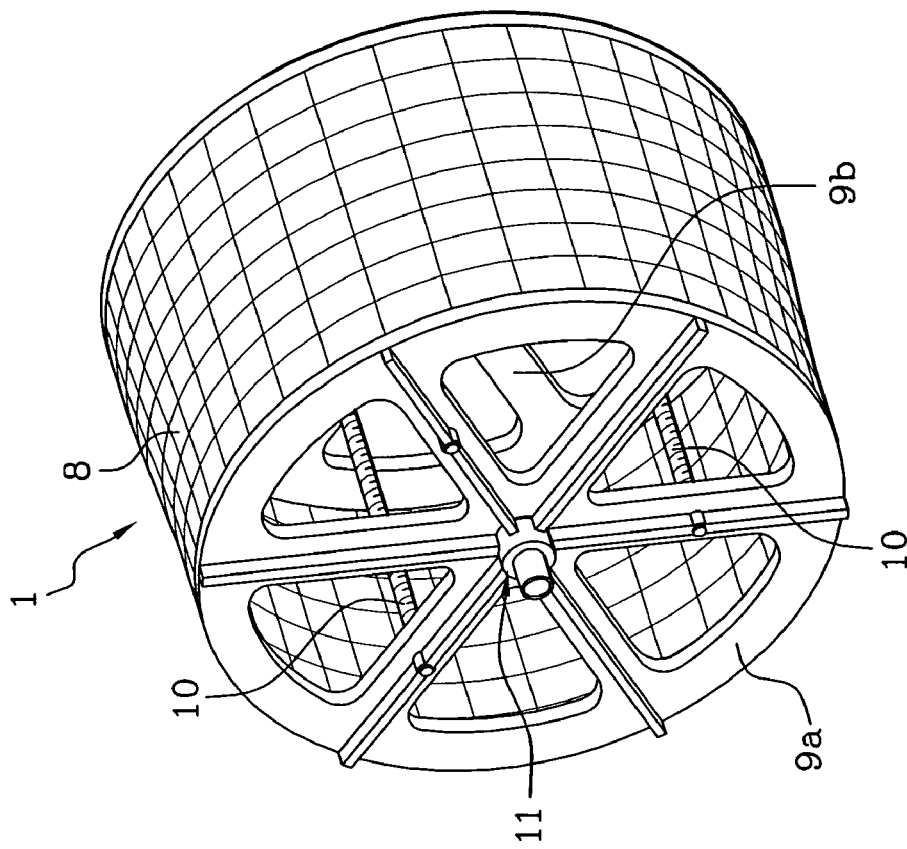
FIG. 4 shows the mandrel of FIGS. 1 and 2 provided with its transport and mounting flanges on a device for rotating the mandrel and on which for example is deposited a resistive layer.

FIG. 4 shows the mandrel 1 of FIGS. 1 and 2 on which has been emplaced for example by winding, banding or draping a resistive layer 8 constituting one of the elements of an air inlet panel without clips in the sense defined above.

The mandrel 1 is inserted between two end flanges 9a, 9b, connected by ties 10, the flanges bearing by their periphery on the sector of the sections.

Along the axis of mandrel 1, on the external surface of the flanges 9a, 9b, are arranged sockets 11 permitting the transport of the mandrel and its emplacement on a device for driving in rotation (not shown) of the mandrel 1 about its axis disposed for example horizontally.

Figure 5:
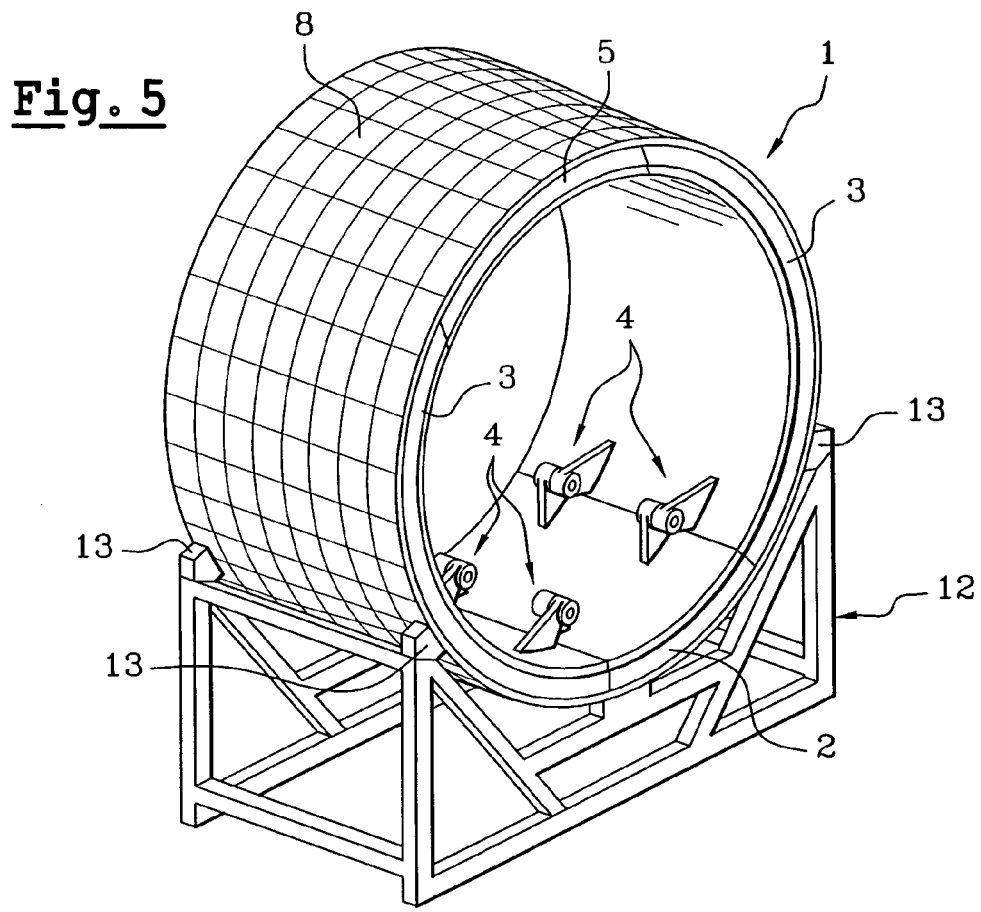
FIG. 5 shows the mandrel of FIG. 4 without its flanges, resting on a cradle, for placing in an autoclave.

FIG. 5 shows the mandrel 1 of FIG. 4, without its flanges 9a, 9b and in place on a cradle 12 for passage for example into an oven or an autoclave to polymerize the resin of the resistive layer 8. The mandrel 1 rests on peripheral shoes 13. It is however to be noted that the mandrel 1 could enter the oven or autoclave without first having its flanges removed.

Figure 6:
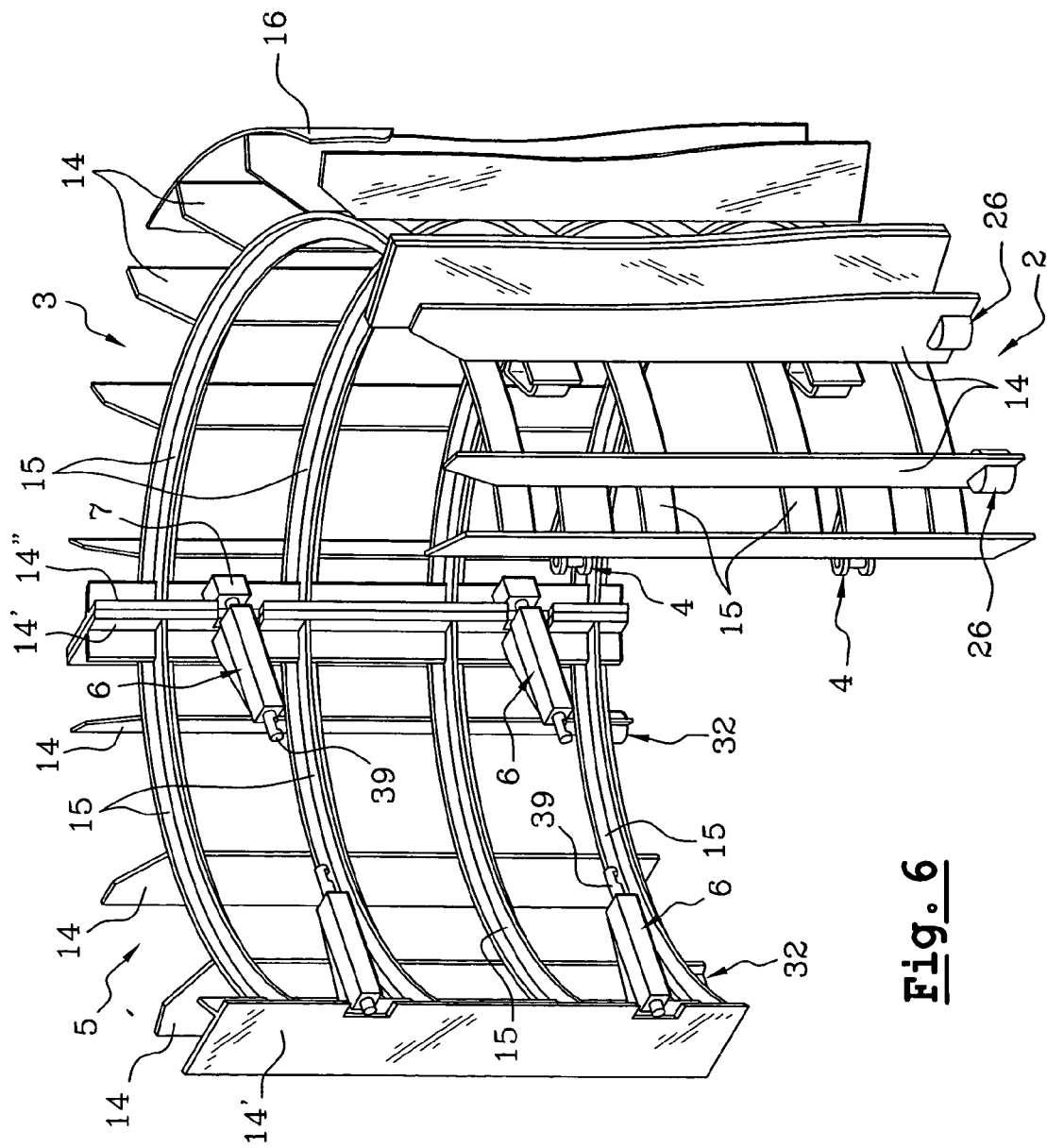
FIG. 6 is a fragmentary perspective view of an example of structure of a mandrel according to the invention.
Figure 7:
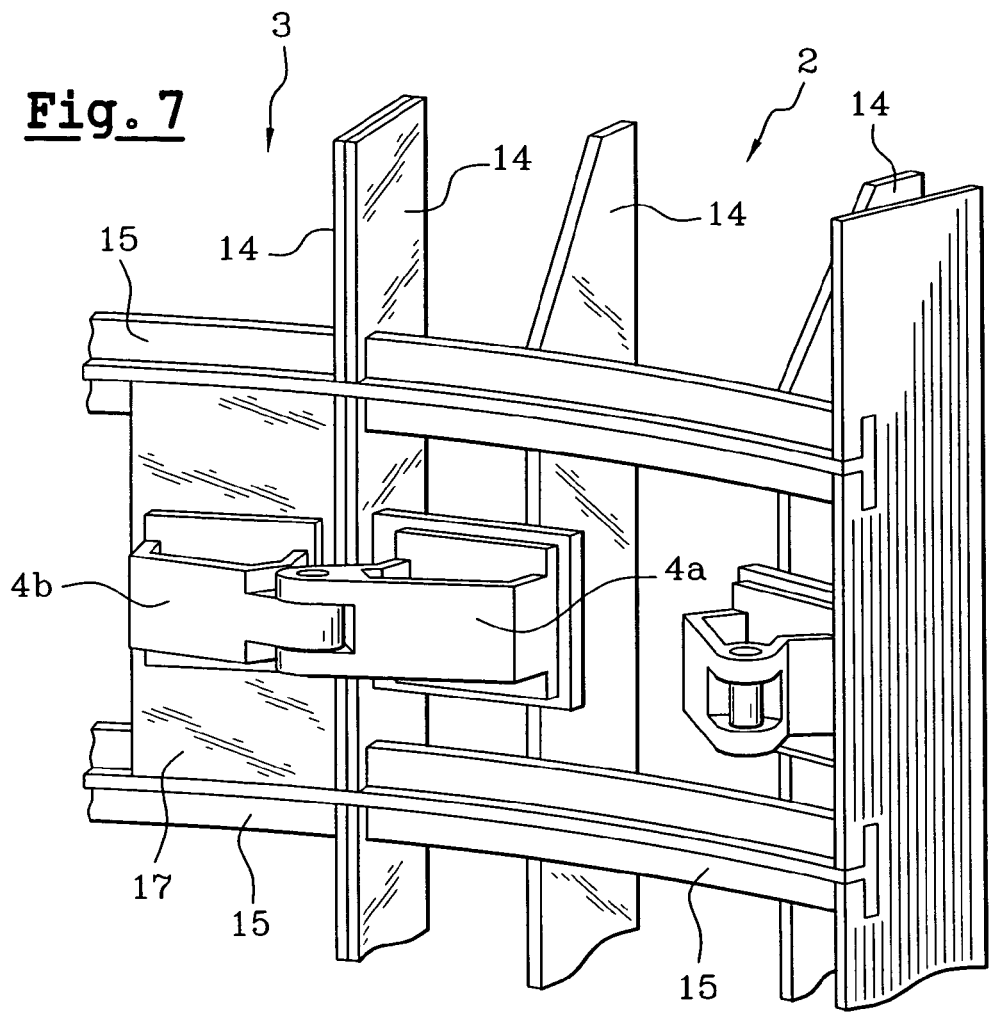
FIG. 7 is a detailed view of the structure of FIG. 6.
Figure 8:
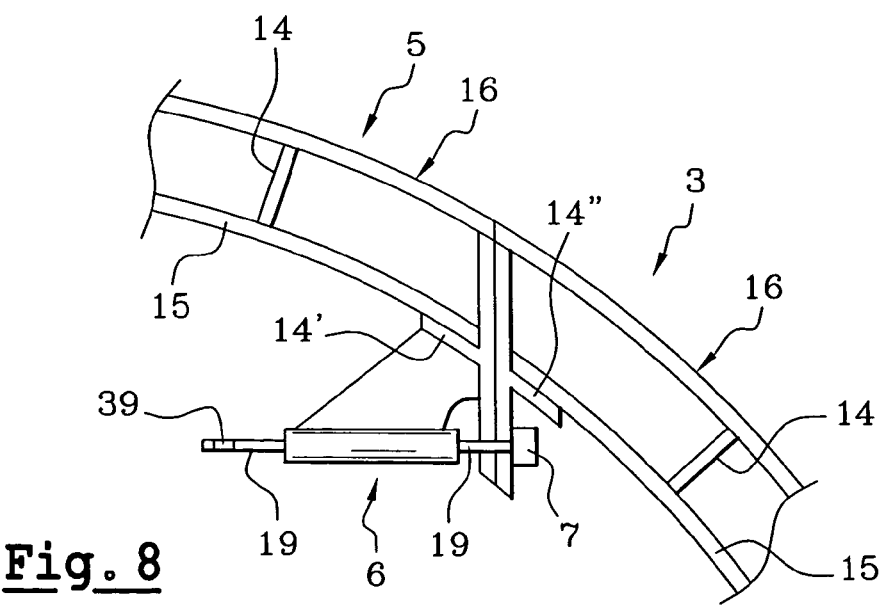
FIG. 8 is a top plan view of the key sector of the mandrel of FIG. 6 in line with the junction between the key sector and one of its adjacent sectors.
Figure 9:
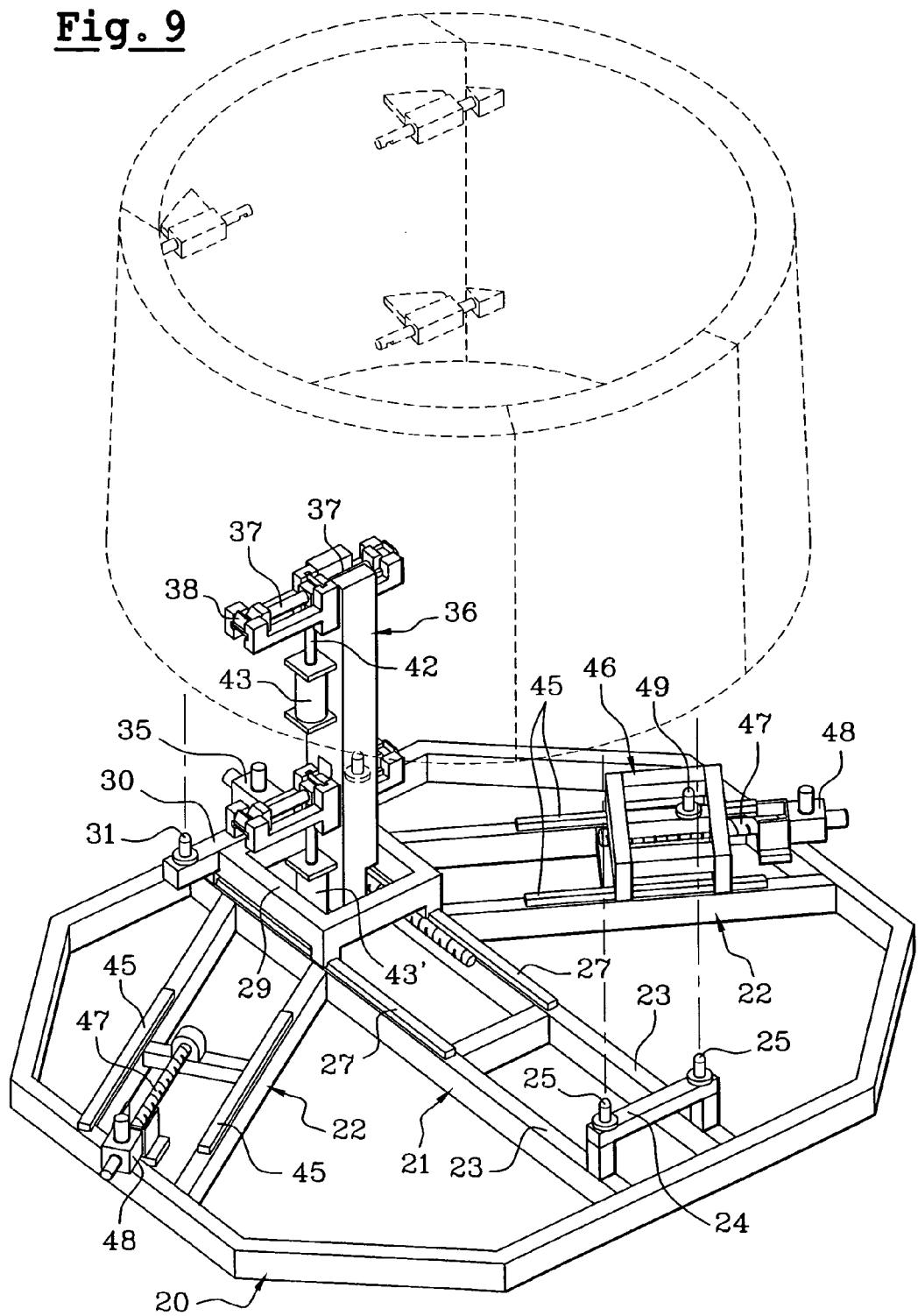
FIG. 9 is a perspective view of the tooling designed to permit the modification of the mandrel from the molding configuration of FIG. 2, to the un-molding configuration of FIG. 3.

FIGS. 6 to 8 show an embodiment of the structure of the sectors of mandrel 1.

In FIG. 6, there is shown a fixed sector 2, an articulated sector 3 and a key sector 5, all constituted by a framework formed by parallel uprights 14 interconnected on the internal side by parallel flanged cross-pieces 15 and, on the outer side, by a thin sheet 16 whose external surface defines the molding surface of the mandrel.

The locks 6 of the key sector 5 are fixed on reinforced lateral uprights 14' and coact with keepers 7 also fixed on reinforced lateral uprights 14" of the articulated section 3.

Moreover, as can be seen in FIG. 7, the two elements 4a, 4b of each hinge 4 for articulation between the sectors 2 and 3 are fixed, on the one hand (4a) on the uprights 14 of the fixed sector 2 and, on the other hand (4b) on a plate 17 connecting two cross-pieces 15 of the sector 3.

FIG. 8 is a fragmentary top plan view of the structure of FIG. 6, at the junction between the key sector 5 and one of the articulated sectors 3.

The lock 6 is carried by a plate 18 itself fixed to the lateral upright 14' of the key sector 5.

The latch 19 of the lock passes through the wall of the upright 14' and that of the lateral upright 14" of the sector 3 and engages in the keeper 7.

The latch 19 is moved with the help of means described later with reference to FIG. 11.

FIGS. 9 to 12 show an embodiment of the means adapted to place the mandrel 1 in one or the other of its molding configurations (FIG. 1) and un-molding configurations (FIG. 3).

These means comprise a tubular steel chassis 20 of generally octagonal shape, defining a first movement track 21 diametral to the octagonal structure, flanked by two symmetrical movement tracks 22, converging in a direction substantially from one of the ends of said first track 21.

The track 21 is defined by two horizontal parallel beams 23.

Figure 10:
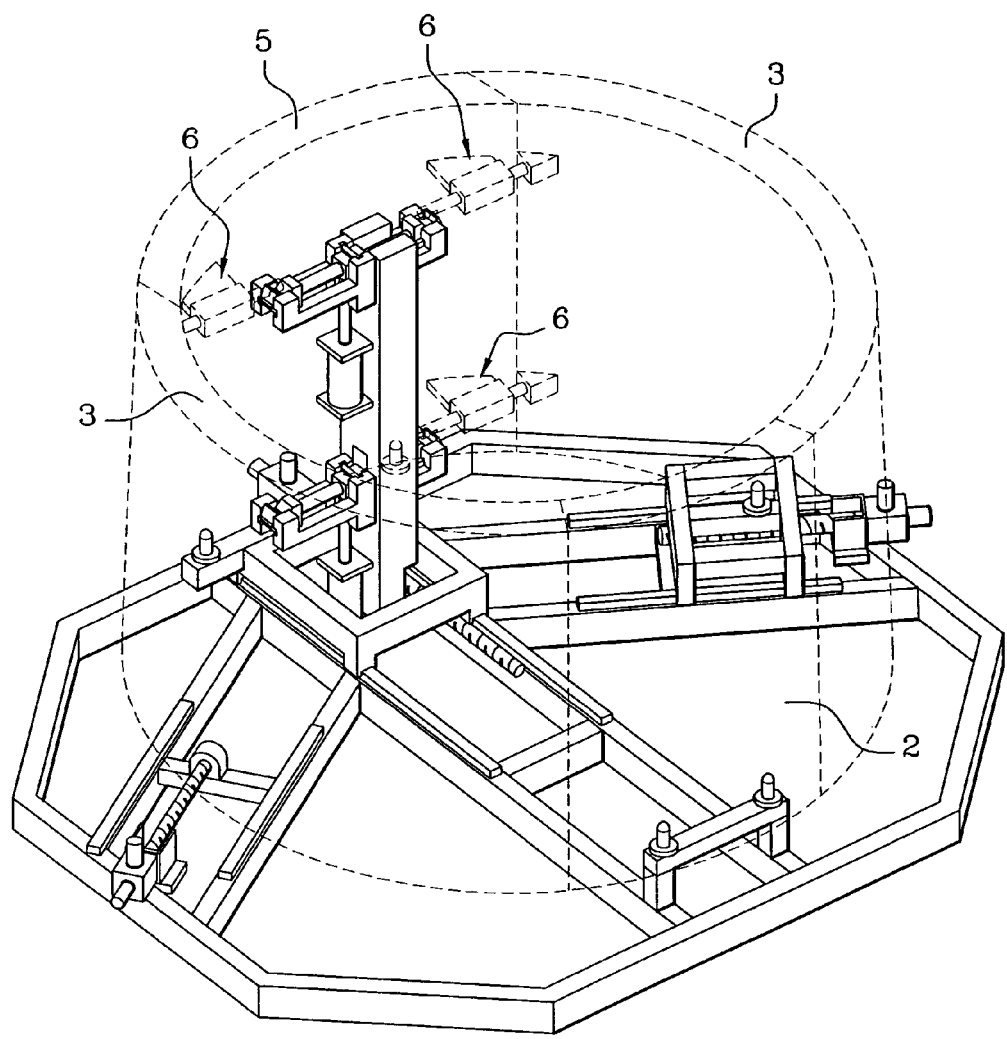
FIG. 10 shows the tooling of FIG. 9 with, in place, the mandrel, partially represented.

At one of the ends of the track 21 is fixed on the beams 23 a crosspiece 24 carrying two pins 25 adapted to support and center in vertical position the fixed sector 2 of the mandrel. To this end, in the lower portion of the sector 2 (FIG. 6) are disposed, at the end of two uprights 14, sockets 26 adapted to engage over the pins 25, as shown in FIG. 10.

From the other end of the beams 23 and on their upper surface are fixed two rails 27 extending substantially over a little more than half of the length of said beams.

On the rails 27 move, by means of shoes 28 (FIG. 12), a carriage 29 whose end (outer side) carries a cross-piece 30 provided with two support and centering pins 31, analogous to the pins 25 and adapted to receive sockets 32 analogous to the sockets 26, provided at the lower end (FIG. 6) of uprights 14 of the key sector 5.

The carriage 29 is moved by a screw 33 driving a nut 34 secured to the carriage 29.

The screw 33 turns in the carriage 20 and is provided at its external end with a return angle 35 for controlling the screw either manually or by pneumatic screwing.

The carriage 29 carries a post 36 supporting two devices for actuating two pairs of locks 6. FIG. 11 shows in greater detail the actuating device of the upper pair of locks of the key sector 5.

Each device comprises a control rod constituted by two lateral returns 37 whose ends in the form of hooks 38 coact with the complementary ends 39 (FIGS. 6 and 8) of the latches 19 of the locks 6.

The locks 37 are articulated on a head 40 movable vertically in guide slides 41 fixed to the post 36, under the action of the rod 42 of a jack 43 also fixed to the post.

The ends 38 of the returns 37 are held by guides 44 secured to the post 36.

Figure 11:
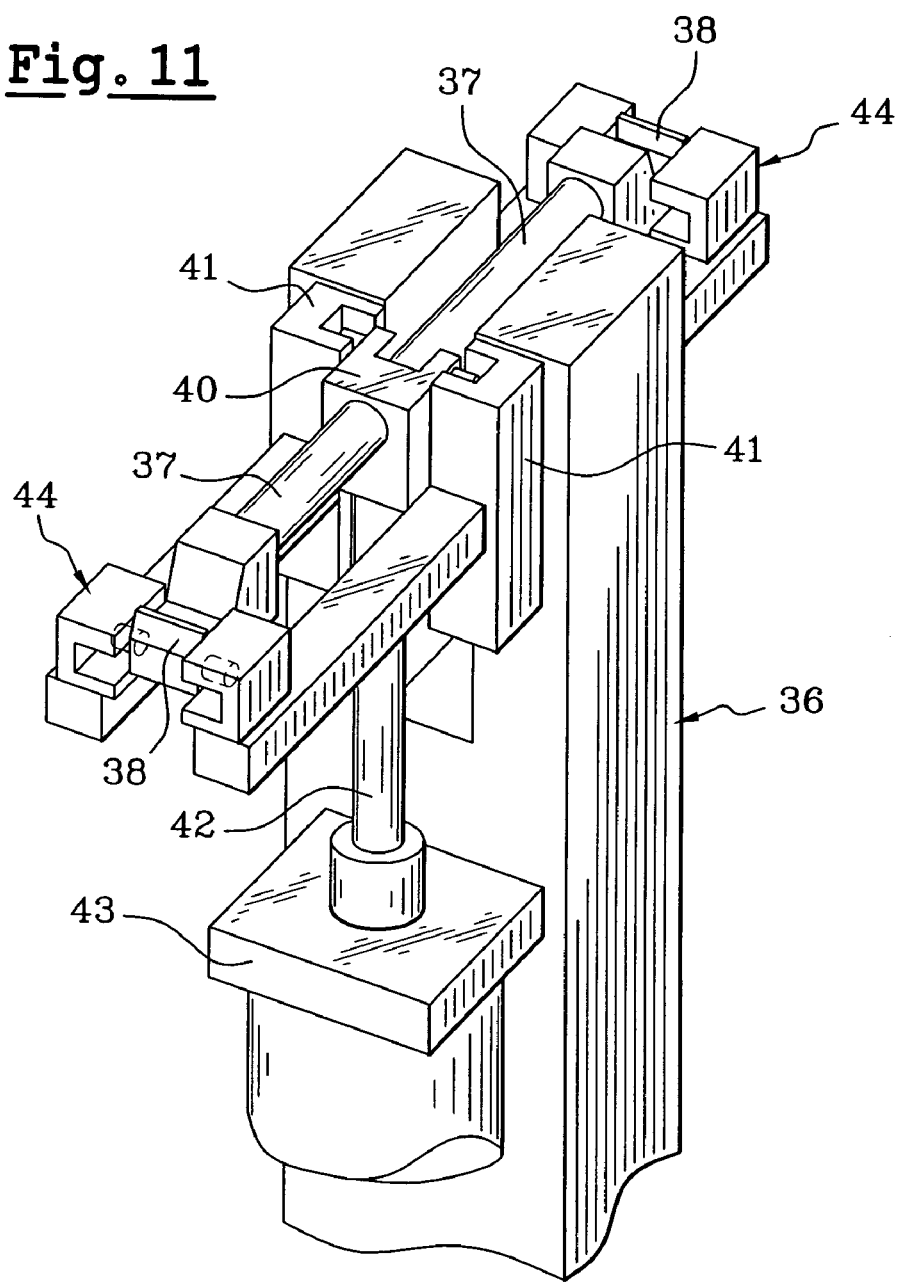
FIG. 11 is a detailed view of the control means of the tooling of the locking of the key sector.
Figure 12:
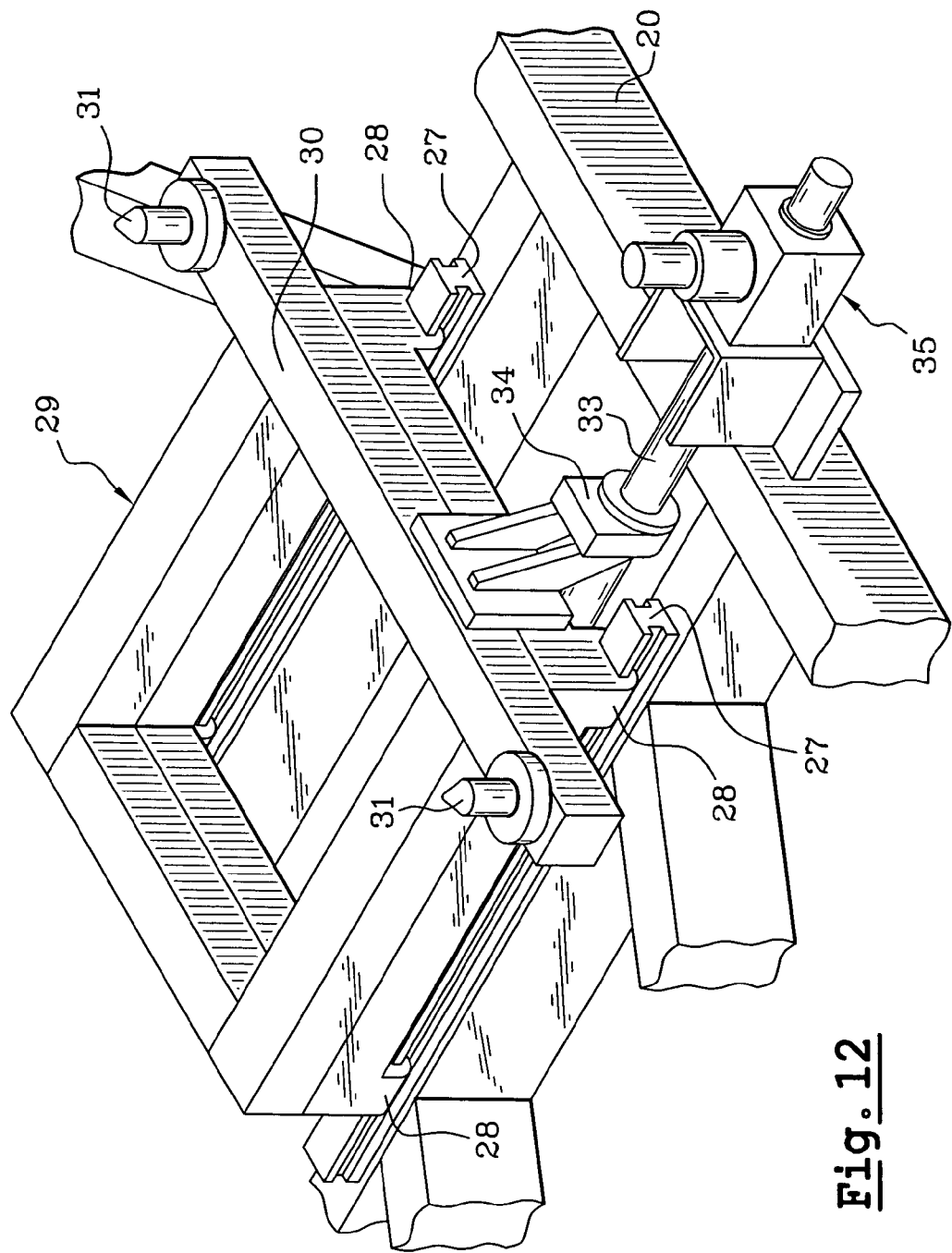
FIG. 12 is a detailed view of control of the movement of a tool carriage of FIG. 9.

At the hood of the post is disposed, fixed to the carriage 29, a second jack 43' (FIG. 9) for actuating the lower locks 6 by a mechanism identical to that of FIG. 11.

Each track 22 comprises two parallel beams carrying two rails 45 on which circulate by means of shoes a carriage 46 moved, like the carriage 29, with the help of a screw 47 provided with an angle return 48.

Each carriage 46 carries a drive and guide pin 49 adapted to be received in a suitable throat (not shown) provided at the lower end of each articulated sector 3.

In FIG. 10, there is partially shown the mandrel 1 in molding position, directly over its rest position on the chassis 20. The mandrel is simply disposed on the pins 25 (fixed sector 2), on the pins 31 (key sector 5) and on the pins 49 (articulated sectors 3), the carriages 29 and 46 being in one of their two end positions on their respective movement tracks 21 and 22.

In this position of the carriage 29, the returns 37 of the actuating devices for the locks 6 are located in the vertical plane defined by the four locks 6.

To pass from the un-molding position of the mandrel 1 of FIG. 3, the unlocking of the locks 6 is effected by retracting the rod of the jacks 43, 43', then the carriage 29 is moved in the direction of the center of the chassis 20, the carriages 46 being still stationary and locked.

When the carriage 29 has reached its maximum retracted position, and even a little before this position is reached, the carriages 46 can be actuated, simultaneously or not, to cause to pivot inwardly the articulated sectors 3 by rotation about the axis of the hinges 4, the sectors being driven by the pins 49.

The sectors of the mandrel being thus positioned, it is easy to withdraw the molded envelope 8 (FIG. 3).

The screws 33 and 47 are preferably controlled automatically by a control device (not shown) synchronizing the movements of the carriages 29, 46 to accelerate the manipulation, but said screws 33, 47 can be controlled manually with the help of a crank for example.

To reconstitute the mold, the reverse series of movements is carried out.

Once the mandrel has been shaped, after blocking the locks 6, the control devices (37, 38) of said locks can be loosened and there can be removed from the chassis 20 the mandrel 1 which is self-supporting thanks to the locked key sector 5, to provide it with the flanges 9a, 9b for transport and rotation.

The mandrel 1 is replaced on the chassis 20, either after polymerization of the resistive layer so as to recover this latter, the other elements of the sandwich defining the air intake panel being emplaced according to other techniques, or after final polymerization of said sandwich, so as to recover the panel for its finishing, all the elements of the panel being emplaced on the mandrel from the outset.

There has been described above a preferred embodiment of the mandrel with keys, but it is to be noted that the mandrel according to the invention can comprise a number of sectors different from four, namely a lesser number, essentially three sectors, or a greater number, particularly five sectors.

Figures 13, 14:
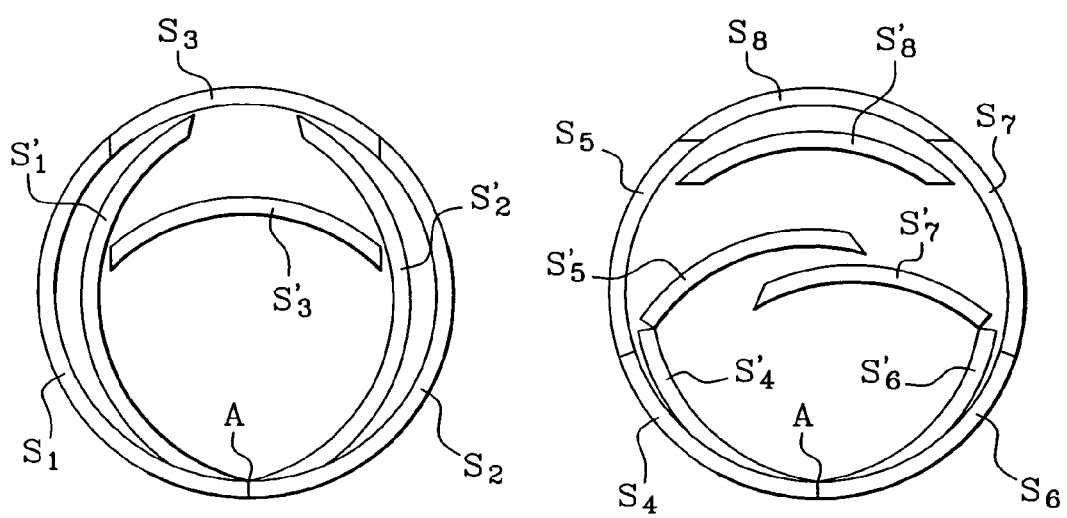
FIG. 13 shows the embodiment of a mandrel with three sectors.
FIG. 14 shows the embodiment of a mandrel with five sectors.

In the version with three sectors, shown in FIG. 13, two sectors S1 and S2 are articulated one on the other about a fixed axis A of rotation and the third sector S3 forming the key sector is independent and movable and can be inserted between the two others in the deployed position to constitute by abutment a continuous surface corresponding to the internal surface of an air intake. In the un-molding position, the key sector S3 is first of all moved toward the center of the mandrel (position S' 3), then the sectors S1, S2 are folded toward each other (positions S' 1, S' 2).

In the five sector version, shown in FIG. 14, four sectors S4 to S7 are articulated relative to each other symmetrically about a fixed axis A of rotation, and a fifth sector S8 is an independent key sector movable diametrically of the mandrel.

In the molding position, the sectors S4 to S7 abut. In the un-molding position of the mandrel, the articulated sectors S4 to S7 are first folded toward the center of the mandrel as shown at S' 4 to S' 7 in FIG. 14, then the key sector S8 is moved toward the center of the mandrel at S' 8.

Generally speaking, and no matter what the number of sectors, the mandrel comprises an independent and movable key sector, the other sectors being articulated to each other or movable so as to be retractable inwardly of the mandrel.

The invention claimed is:

1. Tooling for molding with keys for the production in particular of air intakes without clips of substantially tubular shape, said tooling comprising:
   a self-supported mandrel with keys comprising at least three sectors in the form of panels, namely at least two articulated sectors retractable toward the center of said mandrel and a so-called key sector independent from the other sectors and insertable between these latter, thereby, by abutment, to define, by their external surface, a continuous surface corresponding to the internal surface of the air intake;
   means to lock said sectors in abutted position;
   and a control device, disconnectable from the mandrel, for the relative displacement of the movable sectors to place them either in a molding position by abutment of the sectors, or in an un-molding position by retraction of said sectors inwardly of the mandrel.

2. Tooling for molding with keys, said tooling comprising:
   a mandrel with keys comprising four sectors, namely a fixed sector flanked by two articulated sectors that are symmetrical and articulated on the fixed sector and a key sector independent of the other sectors and insertable between the two articulated sectors;
   means to lock in the sectors in abutted position, the mandrel being thus self-supporting;
   a control device for controlling the relative movement of the sectors to place them either in a molding position by abutment of all the sectors, or in an un-molding position by retraction of the three movable sectors inwardly of said mandrel, the control device being disconnectable from the mandrel and,
   means permitting the transport and the rotation of the mandrel in its molding position, constituted by two removable flanges adapted to the two ends of the mandrel, said flanges being connected by securement ties and provided in their center with a socket for connection to drive means for said mandrel in rotation about its axis.

3. Tooling according to claim 2, said control device for displacement of the sectors is constituted by a structure for reception of the mandrel in axially vertical position, comprising:

first fixed means on which the fixed sector rests, second movable means on which the key sector rests, these means being movable diametrically of the mandrel, and third and fourth movable means for support respectively of the two articulated sectors, said third and fourth means each comprising a carriage movable internally of the mandrel and carrying a drive means on which rests one of said articulated sectors.

4. Tooling according to claim 2, wherein the articulated sectors and the key sector are provided with locking means of said sectors in abutted position.

5. Tooling according to claim 4, wherein said second means carry said control means of said locking means.

6. Tooling according to claim 5, wherein the locking means are constituted by two pairs of locks for movable blocking in translation so as to secure or release two facing portions of two adjacent sectors to be abutted and in that said control means of the locking means are constituted by a pair of articulations for the control of the translation of said locks, each controlled by a jack carried by said post.

7. Tooling according to claim 3, wherein the articulated sectors and the key sector are provided with locking means of said sectors in abutted position.

8. Tooling according to claim 7, wherein said second means carry said control means of said locking means.

9. Tooling according to claim 8, wherein the locking means are constituted by two pairs of locks for movable blocking in translation so as to secure or release two facing portions of two adjacent sectors to be abutted and in that said control means of the locking means are constituted by a pair of articulations for the control of the translation of said locks, each controlled by a jack carried by said post.

10. Tooling according to claim 1, wherein said control device is disconnectable from the mandrel at least when said sectors are in said molding position.

11. Tooling according to claim 2, wherein said control device is disconnectable from the mandrel at least when said sectors are in said molding position.

12. Tooling according to claim 4, wherein said mandrel, equipped with said flanges and said locking means, constitutes a transport structure for a tubular shape molded on said mandrel.

13. Tooling according to claim 4, wherein said locking means comprise a first locking element on one of said articulated sections and a second locking element on said key element that connect to each other to lock said mandrel in said molding position.

14. Tooling for molding with keys for producing substantially tubular air intakes without clips, said tooling comprising:

a self-supported mandrel having at least three sectors, said at least three sectors comprising at least two articulated sectors retractable toward a center of said mandrel and a key sector that is movable independent from said at least two articulated sectors and insertable between said at least two articulated sectors, said at least three sectors abutting together in a molding position, to define, by their external surfaces, a continuous surface corresponding to an internal surface of an air intake;

locking elements to lock said sectors to each other in said molding position; and a control device, removably connected to said mandrel for the relative displacement of said at least three sectors to place said at least three sectors either in said molding position, or in an un-molding position by retracting said sectors inwardly of said mandrel.

* * * * *